(12) United States Patent
Rabasco et al.

(10) Patent No.: US 7,348,048 B2
(45) Date of Patent: *Mar. 25, 2008

(54) VINYL ACETATE-ETHYLENE CARPET BACKINGS HAVING SPILL RESISTANCE

(76) Inventors: John Joseph Rabasco, 268 Alexander Dr., Allentown, PA (US) 18104; William Thomas Evitt, 7626 Twisting Creek La., Ooltewah, TN (US) 37363

( * ) Notice: Subject to any disclaimer, the term of this patent is extended or adjusted under 35 U.S.C. 154(b) by 465 days.

This patent is subject to a terminal disclaimer.

(21) Appl. No.: 10/706,418

(22) Filed: Nov. 11, 2003

(65) Prior Publication Data

US 2005/0100706 A1    May 12, 2005

(51) Int. Cl.
*B32B 33/00*    (2006.01)
*B32B 27/04*    (2006.01)
*D03D 97/00*    (2006.01)

(52) U.S. Cl. ............................ 428/96; 428/85; 428/95; 442/85; 442/86

(58) Field of Classification Search ............... 428/85, 428/95–97; 442/93, 85–86
See application file for complete search history.

(56) References Cited

U.S. PATENT DOCUMENTS

| 3,644,262 | A | | 2/1972 | Stehle et al. |
|---|---|---|---|---|
| 4,164,489 | A | | 8/1979 | Daniels et al. |
| 4,239,563 | A | | 12/1980 | Iacoviello |
| 4,735,986 | A | | 4/1988 | Iacoviello |
| 4,990,399 | A | * | 2/1991 | Hoopengardner ........ 428/317.3 |
| 6,319,978 | B1 | * | 11/2001 | Daniels et al. .............. 524/564 |
| 6,559,259 | B2 | * | 5/2003 | Kohlhammer et al. ...... 526/287 |
| 2004/0175589 | A1 | * | 9/2004 | Rabasco et al. ............ 428/511 |
| 2005/0014013 | A1 | * | 1/2005 | Daniels et al. .............. 428/507 |

FOREIGN PATENT DOCUMENTS

| JP | 07195637 A | * | 8/1995 |
|---|---|---|---|
| WO | WO 00/09798 | | 2/2000 |

\* cited by examiner

*Primary Examiner*—Lynda Salvatore
(74) *Attorney, Agent, or Firm*—Mary E. Bongiorno; Russell L. Brewer

(57) ABSTRACT

This invention relates to an improvement in spill resistant carpets wherein a spill resistant coating is applied to the underside of the carpet. The improvement for enhancing the spill resistance of the carpet comprises use of the following polymer as the spill resistant coating:

an ethylene-vinyl acetate polymer comprised of crystalline ethylene segments prepared by the aqueous emulsion polymerization of ethylene and vinyl acetate in the presence of a stabilizing system, said ethylene-vinyl acetate polymer having a crystalline melting point ranging from 35 to 110° C. measured at a heat rate of 20° C. per minute; and, a tensile storage modulus of at least $1 \times 10^5$ dynes/cm$^2$ at a temperature of 115° C. and measured at 6.28 rad/sec.

18 Claims, No Drawings

VINYL ACETATE-ETHYLENE CARPET BACKINGS HAVING SPILL RESISTANCE

BACKGROUND OF THE INVENTION

Rugs and carpets in general are formed from tufted synthetic yarns threaded through a primary backing or substrate and adhered to a secondary backing by means of a laminating adhesive are widely used.

Double-backed tufted carpets are generally made by looping threads of pile fibers through an inexpensive woven or unwoven textile base, known as the primary substrate. The thread is looped through the primary substrate in one continuous length constituting a complete row of pile in the carpet. The thread is pulled tightly against the underside of the primary substrate, but the loops can remain connected or be severed, depending on whether a loop pile or a cut pile carpet is desired. The pile fibers are then anchored to the primary substrate in this arrangement by the application of a laminating adhesive. The double-backed tufted carpet is completed by applying to the wet underside of the primary substrate a further backing material known as the secondary fabric or as scrim which serves to improve the dimensional stability and appearance of the carpet. Primary backings and secondary backings are often formed from jute, burlap or melt fused fibers.

Many types of laminating adhesives have been utilized for the bonding of the primary backing to the secondary backing. One type of polymeric adhesive is based upon a carboxylated styrene-butadiene copolymer. However, these polymers exhibit a strong odor. Vinyl acetate/ethylene emulsions have been widely used as laminating adhesives to formulate carpet backings and they offer excellent flexibility, odor resistance and tolerance to inorganic fillers.

In the manufacture of carpeting, there have been developments which are directed to improving the water resistance of the carpet and particularly the spill resistance, i.e., the ability to prevent spilled liquids from permeating to the underside of the carpet. Indoor carpets, which, although not designed for contact with liquids do, on occasion, encounter liquid spills and large spills often permeate through the carpet and create significant problems. Not only can the spill damage the underlying floor, it can remain absorbed within the carpet and inaccessible by various cleaning methods. Solutions for producing spill resistant carpets have included the application of a spill resistant coating onto the carpet precoat, thereby, adding an essentially impermeable layer between the carpet and the underlying floor. Wax, silicone-based compositions, hydrophobic acrylate resins and so forth have been used in developing spill resistant carpets.

The following publications are representative of the state of the art with respect to use of polymeric compositions in producing carpets.

U.S. Pat. No. 4,239,563 (Iacoviello, 1980) discloses the use of vinyl acetate-ethylene copolymer emulsions as laminating adhesives for carpet backing. Vinyl acetate/ethylene copolymer emulsions having a Tg of from −35 to about −10° C. protected with poly(vinyl alcohol) and incorporating a small amount of maleic acid or triallyl cyanurate showed good tuft lock as compared to carboxyated styrene-butadiene latexes.

U.S. Pat. No. 4,735,986 (Iacoviello, 1988) discloses vinyl acetate/ethylene emulsions prepared using a stabilizing system based upon a mixture of polyvinyl alcohols, one being 86-90 mole percent hydrolyzed and the other being at least 98% hydrolyzed and a polyalkoxylated surfactant. These emulsions are used as a laminating adhesive for carpet backings.

WO 00/09798 (Tabor et al., 2000) discloses an aqueous dispersed polymeric composition for preparing spill resistant carpet backings. The compositions are based upon polymeric materials such as butadiene-acrylonitrile latexes, polyurethane dispersions ethylene-vinyl acetate latex, etc., an inorganic filler, and a hydrophobic acid. Methods described in U.S. Pat. No. 3,644,262 and 4,164,489 were suggested for forming ethylene-vinyl acetate latexes suited for producing spill resistant carpets. Other solutions for improving spill resistance of carpets have relied on the application of wax, silicone-based compositions, hydrophobic acrylate resins and so forth.

U.S. Pat. No. 3,644,262 (Stehle et al., 1972) discloses the emulsion polymerization of vinyl acetate and ethylene to produce a polymer suited for paint applications. Emulsion polymerization is carried out under conditions to increase ethylene concentration, e.g., the unreacted vinyl acetate content is maintained at a level below about 3% and preferably below 1% by weight.

U.S. Pat. No. 4,164,489 (Daniels et al., 1979) discloses a continuous process for producing a laminating adhesive comprised of polymerized units of vinyl acetate and ethylene.

BRIEF SUMMARY OF THE INVENTION

This invention relates to an improvement in spill resistant carpets wherein a spill resistant coating is applied to the underside of the carpet. The improvement for enhancing the spill resistance of the carpet comprises:

an ethylene-vinyl acetate polymer as the spill resistant coating, said ethylene-vinyl acetate polymer comprised of crystalline ethylene segments prepared by the aqueous emulsion polymerization of ethylene and vinyl acetate in the presence of a stabilizing system, said ethylene-vinyl acetate polymer having:

(a) a crystalline melting point ranging from 35 to 110° C. measured at a heat rate of 20° C. per minute; and, (b) a tensile storage modulus of at least $1 \times 10^5$ dynes/cm$^2$ at a temperature of 115° C. and measured at 6.28 rad/sec.

There are significant advantages which can be achieved with this invention. These include:

an ability to produce a spill resistant carpet construction through the use of a latex adhesive which retains its flexibility after application;

an ability to prevent passage of water and other liquids through the carpet to the surface below the carpet; and, an ability to adhere the coating to many of the synthetic fibers employed in the manufacture of carpets.

The end use for this invention can be institutional use, such as in nursing homes and hospitals.

DETAILED DESCRIPTION OF THE INVENTION

Adhesive compositions are essential to the structure of rugs and carpets. Tufted synthetic yarn could not function as a carpet without the presence of a laminating adhesive to laminate a secondary fabric, to the tufted primary fabric. The laminating adhesive functions to lock the tufts as well as bond the secondary fabric to the primary tufted material.

Spill resistant coatings differ from laminating adhesives in function and are applied to the underside of the carpet to prevent liquids from permeating through the carpet and contacting the surface (such as wood) underneath. They prevent damage to the underlying floor and allow for easier cleanup of the carpet. In many instances the polymeric compositions employed for use as a laminating adhesive have some spill resistant properties and some spill resistant coatings have some laminating adhesive properties but, in general, the polymers are formulated for their specific application.

The amount of coating which is applied to the carpet back depends on the weight of the carpet and the contour of the carpet back. A high weight carpet and one with a rough back will require more coating than a lower weight carpet and one with a smoother back. The spill resistant coating can be applied in an amount ranging from 7 to 20 dry ounces/square yard on the carpet back; typically 10 to 15 dry ounces/square yard on the carpet back.

Although vinyl acetate and ethylene copolymer emulsions have been widely used as a laminating adhesive for carpet backing, they do not have the necessary water resistance and resistance to major spills required of spill resistant carpets marketed today. One reason for this deficiency is that many of the vinyl acetate/ethylene laminating adhesives are stabilized with poly(vinyl alcohol), a water sensitive stabilizer. Another reason, it has been found, can be accounted for in the distribution of ethylene and its structure within the polymer. By effecting a change of distribution of the vinyl acetate and ethylene and the structure of ethylene in the polymer one can achieve the necessary adhesion and an increased resistance to water and other liquids.

The distribution of vinyl acetate and ethylene and the form of the ethylene in the polymer are dictated by many factors outside the specific formulation employed, e.g., the monomer ratios employed at a given time during the polymerization process. As for example, the ratio may be at one level initially and changed during the polymerization. Other factors which can affect the distribution and the form of ethylene in the polymer include initiator level. Thus, two polymers having substantially equal levels of vinyl acetate and ethylene can have a substantially different distribution of ethylene as well as a different ethylene structure in the polymer and, thereby, achieve dramatically different properties, e.g., water resistance.

The aqueous based ethylene-vinyl acetate polymers suited for producing spill resistant carpets formed by emulsion polymerization generally have a level of polymerized units of vinyl acetate ranging from 15 to 90% by weight of the polymer and the level of polymerized units of ethylene ranging from 10% to 85% by weight; preferably from 25 to 80 weight percent vinyl acetate and 20 to 75% by weight ethylene; and most preferably from 35 to 75% by weight vinyl acetate and 25 to 65% by weight ethylene.

An additional component for consistently enhancing the performance of ethylene-vinyl acetate polymers is in the incorporation of a carboxylic acid. These carboxylic acids include $C_3$-$C_{10}$ alkenoic acids, such as acrylic acid, methacrylic acid, crotonic acid, and isocrotonic acid, and alpha, beta-unsaturated $C_4$-$C_{10}$ alkenedioic acids such as maleic acid, fumaric acid, and itaconic acid. These acids can be incorporated in an amount of from 0.2 to 10% by weight or 0.5 to 5% by weight. Exemplary polymers have a vinyl acetate content of from 15 to 80%, an ethylene content from 20 to 85%, and a level of carboxylic acid from 0 to 5% by weight of the polymer.

Other monomers can be emulsion polymerized into the polymer and these include $C_1$-$C_{18}$ alkyl esters or esters with $C_1$-$C_{18}$ alkanols, such as methanol, ethanol, propanol, butanol, and 2-ethylhexanol; vinyl halides, such as vinyl chloride; mono and diesters of alpha, beta-unsaturated $C_4$-$C_{10}$ alkenedioic acids such as maleic acid, fumaric acid, and itaconic acid and $C_1$-$C_{18}$ alkanols; nitrogen containing mono-olefinically unsaturated monomers, particularly nitriles, amides, N-methylol amides, $C_1$-$C_4$ alkanoic acid ethers of N-methylol amides and allyl carbamates, such as acrylonitrile, acrylamide, methacrylamide, N-methylol acrylamide, N-methylol methacrylamide, N-methylol allylcarbamate, and $C_1$-$C_4$ alkyl ethers or $C_1$-$C_4$ alkanoic acid esters of N-methylol acrylamide, N-methylol methacrylamide and N-methylol allylcarbamate; sodium vinyl sulfonate; and 2-acrylamido-2-methyl propanesulfonate. The monomers often are incorporated only in minor amounts, e.g. from 0 to about 5% by weight.

The vinyl acetate/ethylene copolymers prepared herein and used as the spill resistant coating have amorphous and crystalline ethylene segments. The level of amorphous and crystalline ethylene segments in the polymer have been accounted for in the parameters, i.e., the glass transition temperature ($T_g$), the thermal melt temperature ($T_m$), the heat of fusion ($H_f$), and high temperature tensile storage modulus. It is these properties which provide for the increased barrier properties with respect to water and other liquids that may contact the carpet and enhanced adhesion to synthetic fibers.

In accordance with the present invention of producing carpets having spill resistant properties, soft, copolymer emulsions based on vinyl acetate and ethylene are prepared which have a $T_g$ of between about +25° C. and about –35° C., preferably from ±10 to –25° C. As is known, the $T_g$ of the polymer can be controlled by adjusting the ethylene content, i.e., generally the more ethylene present in the polymer relative to other co-monomers, the lower the $T_g$. However, it has been found that under certain polymerization conditions where formation of crystalline polyethylene domains are favored, the $T_g$ does not continue to systematically decrease in proportion to the increase in ethylene concentration. If the ethylene segments were shorter, resulting in amorphous as opposed to crystalline domains, the $T_g$ would drop even further, e.g., below about –40° C.

The $T_m$ of the polymer is reflected in the crystalline melt temperature of the ethylene segments. A $T_m$ ranging from 35 to 110° C. measured at a heat rate of 20° C. per minute is desired. Typically, the $T_m$ is from about 45 to 90° C. for preferred spill resistant coatings.

The $H_f$ as measured in joules/gram (J/g) ranges from 5 to 100 and preferable from about 20 to 50 J/g in desired spill resistant coatings.

The tensile storage modulus profile for these ethylene-vinyl acetate polymers also provides an insight into the distribution of vinyl acetate and ethylene in the polymer and the melt flow characteristics. The polymers having enhanced resistance to spills have a high tensile storage modulus and are highly viscous with minimal flow properties at temperatures where other emulsion polymerized vinyl acetate/ethylene polymers which are water sensitive exhibit different melt flow characteristics. The polymers described herein maintain a high viscosity and resistance to flow at temperatures well above their melt temperatures. The modulus should be at least $1 \times 10^5$ in dynes/cm$^2$, (preferably $2 \times 10^5$) at 115° C. as measured at a test frequency of 6.28 rad/sec.

One preferred way to enhance crystalline domain formation of ethylene in the copolymer and thereby influence the $T_m$, the $H_f$ and the tensile storage modulus of the polymer is to delay the addition of vinyl acetate during the polymerization process such that the unreacted vinyl acetate level present in the reactor is minimal at different stages during the process, i.e., below 5% unreacted free vinyl acetate monomer. Particularly, in the absence of carboxyl functionality, it is preferred to stage the addition of vinyl acetate in the polymerization process over an initial period of time. Typically, one completes the addition within 75% of the total polymerization period and generally within 3 hours or less. Thus, vinyl acetate/ethylene polymerization can take place in one stage where most, but not all, of the ethylene will reside in amorphous regions, and the formation of the majority of crystalline ethylene domains can occur in another stage of the polymerization process.

Other factors leading to crystalline ethylene domains within the polymer is the pressure and temperature of polymerization. Although pressure is influential in achieving higher ethylene concentration levels in the polymer, it also is a factor in determining whether the amount of ethylene which is present is in amorphous regions or crystalline domains. Temperature also is relevant in the formation of crystalline ethylene segments.

Polymerization of the monomers can be effected by the use of thermal initiators or by redox systems. A thermal initiator is typically used at temperatures of about 60° C. or higher, preferably about 70° C. or higher. Redox systems can be used over a wide range of temperatures, but are typically used at temperatures of about 60° C. or lower. The amount of initiator used in the process typically is substantially higher than used in prior processes for forming aqueous based vinyl acetate/ethylene dispersion polymers. Typically, the level of initiator is at least 0.5% and typically greater than 0.8% by weight of the total monomer charged. In addition, it is preferred that the initiator is added over the time of polymerization. It is believed that a high radical flux created by the higher levels of initiator facilitates ethylene incorporation during this low pressure polymerization process and leads to crystalline ethylene segments and a branched polymer architecture in the resulting copolymer and thus exhibits a higher tensile storage modulus at elevated temperatures, thermal melting point, and a heat of fusion. Thermal initiators are well known in the emulsion polymer art and include, for example, ammonium persulfate, sodium persulfate, and the like. Suitable redox systems are based upon reducing agents and peroxides. Reducing agents such as sodium formaldehyde sulfoxylate or sodium erythorbate and peroxides such as hydrogen peroxide or t-butyl hydroperoxide (t-BHP) are representative.

The ethylene and, optionally, other monomers, are introduced to the reaction zone under pressures of less than about 2000 psig (13,891 kPa), typically 1200 to 1800 psig (8375 to 12,512 kPa). High pressure generally is necessary to generate the level of crystalline segments required in the polymer.

The formation of ethylene-vinyl acetate polymers suited as a spill resistant coating is highly influenced by the stabilizer system. First, the stabilizing system must support formation of emulsions having a solids content of at least 40% by weight, generally 50% and higher. Second, the stabilizing systems should be one that does not interrupt ethylene domains leading to crystalline polyethylene segments within the polymer. Third, and in preferred cases, the stabilizing system should not impart water sensitivity to the polymer. In this regard, protective colloids can be used as a component of the stabilizing system. However, water sensitive protective colloids such as poly(vinyl alcohol), which is commonly used in the formation of laminating adhesives, and carboxyethyl cellulose, should be avoided if superior spill resistance is desired. If the polymer described herein is to be used in conjunction with or as a laminating adhesive, then poly(vinyl alcohol) can be employed. Fourth, the preferred stabilizing system should be designed to permit the addition of fillers, e.g., calcium carbonate and pigments, without effecting coagulation of the emulsion.

The surfactant or emulsifier can be used at a level of about 1 to 10 wt %, preferably 1.5 to 6 wt %, based on the total weight of monomers and can include any of the known and conventional surfactants and emulsifying agents, principally the nonionic, anionic, and cationic materials, heretofore employed in emulsion polymerization. Among the anionic surfactants found to provide good results are alkyl sulfates and ether sulfates, such as sodium lauryl sulfate, sodium octyl sulfate, sodium tridecyl sulfate, and sodium isodecyl sulfate, sulfonates, such as dodecylbenzene sulfonate, alpha olefin sulfonates and sulfosuccinates, and phosphate esters, such as the various linear alcohol phosphate esters, branched alcohol phosphate esters, and alkylphenolphosphate esters.

Examples of suitable nonionic surfactants include the Igepal surfactants which are members of a series of alkylphenoxy-poly(ethyleneoxy)ethanols having alkyl groups containing from about 7 to 18 carbon atoms, and having from about 4 to 100 ethyleneoxy units, such as the octylphenoxy poly(ethyleneoxy)ethanols, nonylphenoxy poly(ethyleneoxy)ethanols, and dodecylphenoxy poly(ethyleneoxy) ethanols. Others include fatty acid amides, fatty acid esters, glycerol esters, and their ethoxylates, ethylene oxide/propylene oxide block polymers, secondary alcohol ethoxylates, and tridecylalcohol ethoxylates.

Examples of common cationic surfactants are dialkyl quaternaries, benzyl quaternaries, and their ethoxylates.

Average particle size distributions for the polymer particles of the emulsion polymers of this invention range from 0.05 microns to 2 microns, preferably 0.10 microns to 1 micron.

Conventional hydrophobes and waxes may be added to the emulsion prior to coating of the carpet backing, if desired. Inorganic fillers such as calcium carbonate, calcium sulfate, silica, and aluminum oxide may be used. Hydrophobic compounds, which may be added to the emulsion, include acids, styrene/acrylate polymers, gum rosins wood rosins, tall oil rosins, polyolefins grafted with acids and so forth. The emulsion can be applied as a clear coat in a sufficient amount to form a water resistant film. The emulsions may be applied to the carpet primary backing using equipment such as a doctor knife, air knife and the emulsion dried.

The invention is further clarified by a consideration of the following examples, which are intended to be purely exemplary of the invention.

Ethylene levels in the polymer were determined by mass balance.

Tensile Storage Modulus

Tensile storage modulus as a function of temperature was measured at a test frequency of 6.28 rad/sec and expressed as dynes/cm$^2$. More specifically, dynamic mechanical testing of the polymer samples for measuring tensile storage modulus was accomplished using the following procedure. ASTM-D-4065-94 and ASTM-D-5026-94 were used as guidelines for this procedure. Each polymer emulsion was cast as a film and allowed to dry a minimum of several days at ambient conditions. The dry film thickness was typically in the range of 0.3 to 0.5 mm. For samples that did not film form adequately at room temperature, the polymers were compression molded at 100 to 150° C. The specimens used for testing were die cut from the film and were about 6.3 mm wide and 30 mm long. The specimens were tested on a Rheometrics Solid Analyzer (RSA II), from Rheometric Scientific, Inc., to obtain the tensile dynamic mechanical properties. Data were obtained every 6° C. over the –100 to 200° C. range using a fiber/film fixture and a deformation frequency of 6.28 rad/sec. To help ensure linear viscoelastic conditions, the applied strains were typically 0.05% in the glassy region and up to 1% in the rubbery region. A soak time of one minute was used at each temperature to ensure isothermal conditions. For each temperature, the RSA II calculated the tensile storage modulus (E'), tensile loss modulus (E"), and tangent delta (tan δ) based on the width, thickness and length of the sample.

MEASUREMENT OF $T_g$, $T_m$, and $H_f$ $T_g$, $T_m$, and $H_f$ were determined via differential scanning calorimetry (DSC) using a TA Instruments Thermal Analyst 3100 with DSC 2010 module. Polymer samples were thoroughly dried prior to testing. Samples were held at 100° C. in the calorimeter for 5 minutes, cooled to –75° C., and then the scan acquired at a heating rate of 20° C. per minute up to a final temperature of 200° C. The $T_g$ corresponds to the extrapolated onset values obtained from the baseline shift at the glass transition during the heating scan. The $T_m$ corresponds to the peak in the heat flow curve. The $H_f$ was calculated by integrating the area under the melting endotherm; the baseline for this integration was constructed by extrapolating the linear region of the heat flow curve after the melt, back to the point of intersection with the heat flow curve before the melt.

EXAMPLE 1

VAE Having Crystalline Ethylene Segments Nonionic Surfactant Stabilized

A one-gallon stainless steel pressure reactor was charged with the following material:

| Material | Mass charged, g |
|---|---|
| DI Water | 1000 |
| Tergitol 15-S-40 | 5 |
| Tergitol 15-S-20 (80%) | 6 |
| Monomer solution comprising 98 wt % vinyl acetate and 2 wt % acrylic acid | 120 |

The following delay mixtures were utilized:

| Material | Mass charged, g |
|---|---|
| 10% Aqueous ammonium persulfate/4% sodium bicarbonate | 122 |
| Aqueous Surfactant Delay consisting of 26.2 g Tergitol 15-S-40, 32.8 g Tergitol 15-S-20 (80%), and 291 g water | 270 |
| Monomer solution comprising 98 wt % vinyl acetate and 2 wt % acrylic acid | 363 |
| Ethylene | 1400 psig for 5.5 hours |

Agitation at 100 rpm was begun with a nitrogen purge. Agitation was then increased to 900 rpm and the reactor heated to 80° C. After pressurizing the reactor with ethylene to 1400 psig, 15 g of initiator solution was added at a rate of 1.0 g/min. Then the vinyl acetate/acrylic acid delay was begun at 1.1 g/min, the surfactant delay was begun at 0.75 g/min, and the initiator delay was reduced to 0.30 g/min. Ethylene pressure of 1400 psig was maintained for 5.5 hours. At the 5.5 hour mark, the vinyl acetate/acrylic acid delay and the ethylene were stopped. The initiator delay and the surfactant delay were stopped at the 6 hour mark. Then the reaction mixture was held at temperature for another 30 minutes. Next, the reaction was cooled to 35° C. and transferred to a degasser and 2 g of Rhodaline 675 defoamer was added. The following properties of the resulting emulsion polymer were measured:

| | |
|---|---|
| Polymer Composition (by solids calculation) | 56% Ethylene<br>43.1% Vinyl acetate<br>0.9% Acrylic acid |
| $T_g$ Onset, ° C. | –39.0 |
| Viscosity (60 rpm), cps | 310 |
| % solids | 46.4 |
| pH | 5.0 |
| $T_m$ (° C.)/$H_f$ (J/g) | 57.9/23.2 |

EXAMPLE 2

Manufacture of Spill Resistant Carpet

The emulsion polymer of Example 1 was incorporated into a standard carpet backing formulation as described below:

| | | Weight, g | |
|---|---|---|---|
| % Solids | Material | Dry | Wet |
| 40.0 | Stansperse 440 dispersant | 0.20 | 0.50 |
| 47.0 | Example 1 polymer emulsion | 100.00 | 212.77 |
| 100.0 | Nalco 5793 biocide | 0.07 | 0.07 |
| 100.0 | 200-T whiting | 100.00 | 100.00 |
| 70.0 | Chemtex 2329 nonionic surfactant | 1.00 | 1.43 |
| 43.5 | NBSS-2 starch solution | 9.50 | 21.84 |
| 14.5 | Chemthik 104 thickener | 0.3 | 2.0 |
| | | 211.07 | 338.61 |

The above formulation was doctored in a two step procedure over a previously applied and dried carpet precoat onto the back of a tufted carpet in a continuous film (about 10 dry ounces/square yard of barrier coating) and the coating was dried at 275° F. (135° C.) in a lab convection-air oven before testing for barrier properties.

EXAMPLE 3

Spill Resistance of Carpet as Measured by the British Spill Test

The British Spill Test consisted of pouring 100 ml of a surfactant solution containing a dye onto a carpet and determining the extent of liquid permeation as a function of time. After a 24-hour period, the carpet of Example 2 exhibited no moisture penetration through the carpet.

A carpet coated with a commercial vinyl acetate/ethylene polymer prepared using a stabilizing system comprised of poly(vinyl alcohol) and having no crystalline ethylene segments failed the British Spill Test. Liquid permeation was observed at 10 to 15 seconds. A carpet coated with a crosslinked vinyl acetate/ethylene polymer, in which N-methylolacrylamide was the crosslinking monomer, also performed poorly.

EXAMPLE 4

Spill Resistance Based Upon the Moisture Impact Penetration Test

A more difficult test than the British Spill Resistance Test of Example 3 is the Moisture Impact Penetration Test where the same spill test is conducted, except a plunger cycling up and down onto the carpet, is used to apply pressure and force liquid penetration through the carpet. This formulation containing the emulsion composition of Example 1 lasted for 4000 cycles. The commercial polymer failing the British Spill Resistance endured from 200 to 300 cycles.

When a conventional emulsion polymerized vinyl acetate/ethylene laminating adhesive is exposed to the same water treatment, not only does the carpet degrade but the water carries through to the underlying floor.

Summarizing the above, the polymer of Example 1 had good flexibility and it was capable of forming a continuous film on the carpet back. Many polymer emulsions form films that have pinholes which permit the liquid spill to permeate through the carpet to the underlying floor. The polymer also showed excellent resistance to liquid spills in that there was no observable re-emulsification of the polymer on contact with water.

What is claimed is:

1. In a spill resistant carpet wherein a spill resistant coating is applied thereto to prevent a liquid spill from permeating through the carpet, the improvement which comprises:
a spill resistant coating comprised of an ethylene-vinyl acetate polymer comprised of crystalline ethylene segments prepared by emulsion polymerizing ethylene and vinyl acetate in the presence of a stabilizing system, said ethylene-vinyl acetate polymer having:
a crystalline melting point ranging from 35 to 110° C. measured at a heat rate of 20° C. per minute; and,
a tensile storage modulus of at least $1 \times 10^5$ dynes/cm$^2$ at a temperature of 115° C. and measured at 6.28 rad/sec.

2. The spill resistant carpet of claim 1 wherein the ethylene/vinyl acetate polymer is comprised of from 15 to 90% by weight of polymerized units of vinyl acetate and from about 10 to 85% by weight of polymerized units of ethylene based upon the total weight of the polymer.

3. The spill resistant carpet of claim 1 wherein the polymer is comprised of from 25 to 80% by weight of polymerized units of vinyl acetate and from about 20 to 75% by weight of polymerized units of ethylene based upon the total weight of the polymer.

4. The spill resistant carpet of claim 1 wherein the polymer is comprised of from 35 to 75% by weight of polymerized units of vinyl acetate and from about 25 to 65% by weight of polymerized units of ethylene based upon the total weight of the polymer.

5. The spill resistant carpet of claim 1 wherein the polymer is emulsion polymerized in the presence of a stabilizing system consisting of a nonionic surfactant and an anionic surfactant.

6. The spill resistant carpet of claim 1 wherein the polymer has a tensile storage modulus of at least $2 \times 10^5$ dynes/cm$^2$ at 115° C. and measured at 6.28 rad/sec.

7. The spill resistant carpet of claim 1 wherein the heat of fusion of said polymer is from about 5 to 100 joules per gram as measured at a heat rate of 20° C. per minute.

8. The spill resistant carpet of claim 1 wherein the heat of fusion of said polymer is from about 20 to 50 joules per gram as measured at a heat rate of 20° C. per minute.

9. The spill resistant carpet of claim 1 wherein said ethylene-vinyl acetate polymer has a glass transition temperature from ±25° C. to about −35° C. as measured at a heat rate of 20° C. per minute.

10. The spill resistant carpet of claim 6 wherein the crystalline thermal melting point of said polymer ranges from 45 to 90° C. as measured at a heat rate of 20° C. per minute.

11. The spill resistant carpet of claim 1 wherein polymerized carboxylic acid units are present in said polymer in an amount from about 0.2 to about 10% by weight of said polymer.

12. The spill resistant carpet of claim 11 wherein the polymer has a tensile storage modulus of at least $2 \times 10^5$ dynes/cm$^2$ at 115° C. and measured at 6.28 rad/sec.

13. The spill resistant carpet of claim 11 wherein the polymer is emulsion polymerized in the presence of a stabilizing system consisting of a nonionic surfactant and an anionic surfactant.

14. The spill resistant carpet of claim 11 wherein the heat of fusion of said polymer is from about 5 to 100 joules per gram as measured at a heat rate of 20° C. per minute.

15. The spill resistant carpet of claim 11 wherein the heat of fusion of said polymer is from about 20 to 50 joules per gram as measured at a heat rate of 20° C. per minute.

16. The spill resistant carpet of claim 11 wherein said polymer has a glass transition temperature from ±25° C. to about −35° C. as measured at a heat rate of 20° C. per minute.

17. The spill resistant carpet of claim 12 wherein the crystalline thermal melting point of said polymer ranges from 45 to 90° C. as measured at a heat rate of 20° C. per minute.

18. The spill resistant carpet of claim 11 wherein the polymer comprises 15 to 90% by weight of polymerized units of vinyl acetate, 10 to 85% by weight of polymerized units of ethylene, and 0.5 to 5% by weight of polymerized units of acrylic acid, based on the total weight of the polymer.

* * * * *